US00RE40391E

(19) United States
(12) Reissued Patent
Wada

(10) Patent Number: US RE40,391 E
(45) Date of Reissued Patent: Jun. 24, 2008

(54) COMPUTER

(75) Inventor: Jo Wada, Tokyo (JP)

(73) Assignee: Sony Corporation, Tokyo (JP)

(21) Appl. No.: 29/226,248

(22) Filed: Dec. 30, 2004

Related U.S. Patent Documents

Reissue of:
(64) Patent No.: Des. 467,915
Issued: Dec. 31, 2002
Appl. No.: 29/153,684
Filed: Jan. 14, 2002

(51) LOC (8) Cl. ..... 14-02
(52) U.S. Cl. ..... D14/322
(58) Field of Classification Search ..... D14/318, D14/322–326; D18/1, 2, 6; 235/145 A, 145 R; 341/22, 23; 345/104, 156, 168, 169, 173; 361/680–686; 400/486, 489
See application file for complete search history.

(56) References Cited

U.S. PATENT DOCUMENTS

| | | | |
|---|---|---|---|
| D397,327 | S | 8/1998 | Horiki et al. |
| D397,328 | S | 8/1998 | Ide et al. |
| D412,317 | S | 7/1999 | Horiki et al. |
| D415,474 | S | 10/1999 | Goto |
| D417,658 | S | 12/1999 | Goto |
| D422,569 | S | 4/2000 | Ogasawara |
| D431,559 | S | 10/2000 | Morooka |
| D438,538 | S | 3/2001 | Ogasawara |

FOREIGN PATENT DOCUMENTS

| | | | |
|---|---|---|---|
| JP | D1129046 | S | 12/2001 |
| JP | D1134586 | S | 2/2002 |

*Primary Examiner*—Freda S. Nunn
(74) *Attorney, Agent, or Firm*—Rader, Fishman & Grauer PLLC

(57) CLAIM

The ornamental design for a computer, as shown and described.

DESCRIPTION

FIG. 1 is a front view of a computer showing my new design;
FIG. 2 is a rear elevational view thereof;
FIG. 3 is a left side view thereof;
FIG. 4 is a right side view thereof;
FIG. 5 is a top plan view thereof; and,
FIG. 6 is a bottom plan view thereof.
*Portions of FIGS. 1–6 that are shown as even broken lines are for illustrative purpose only and form no part of the claimed design. The dot-dash broken lines define, but are not included in, the boundaries of the claimed design.*

1 Claim, 4 Drawing Sheets

Matter enclosed in heavy brackets [ ] appears in the original patent, but forms no part of this reissue; matter printed in italics indicates the additions made by reissue.

Amended

Amended

Amended

Fig. 1
Amended
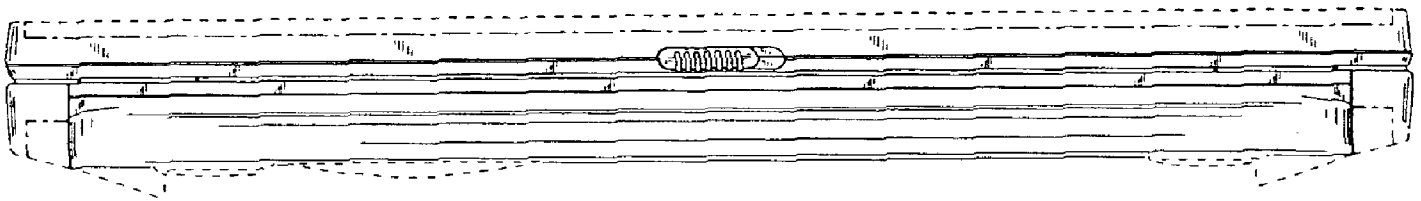
Fig. 2
Amended
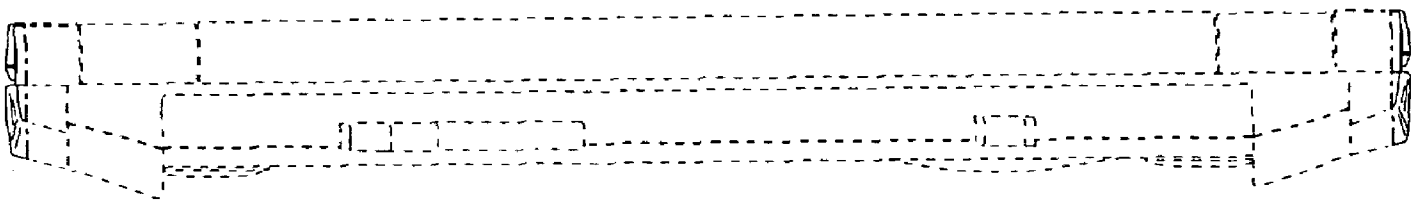

Fig. 3
Amended
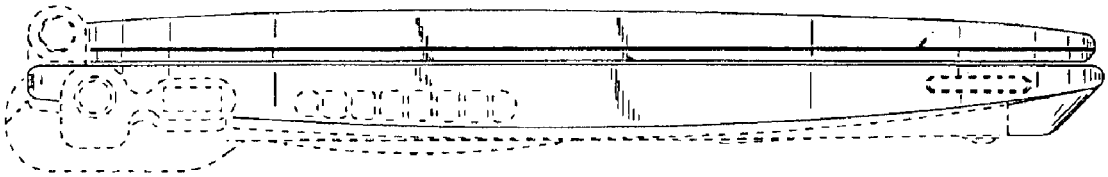
Fig. 4
Amended
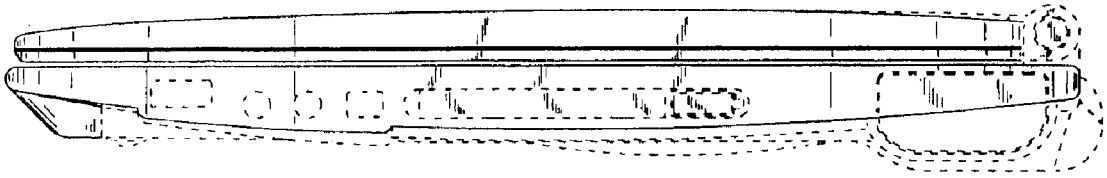

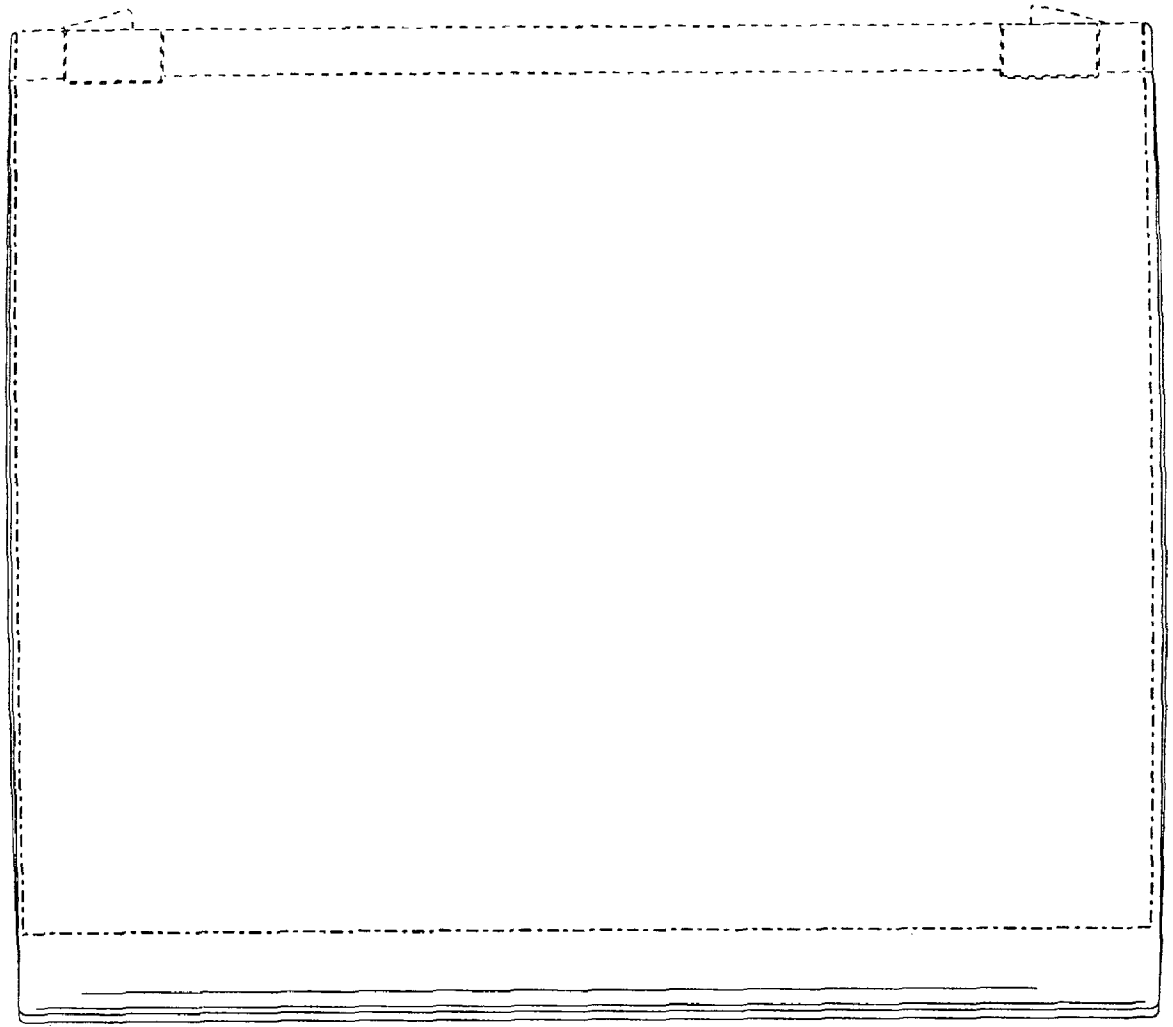
Fig. 5 Amended

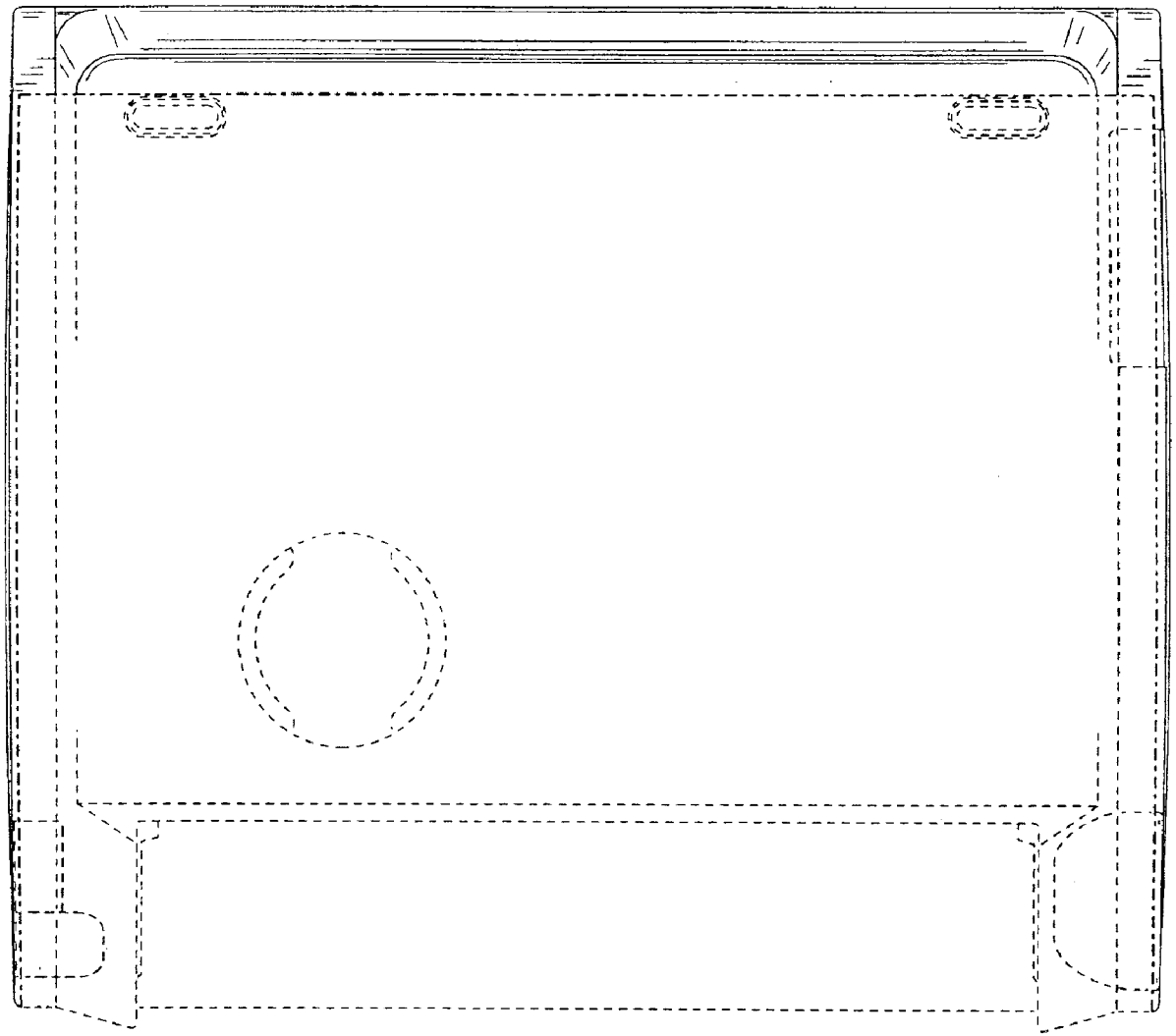
Fig. 6 Amended